United States Patent
Jung et al.

(10) Patent No.: US 10,045,176 B2
(45) Date of Patent: Aug. 7, 2018

(54) APPARATUS AND METHOD FOR PROVIDING A SPECIFIC SERVICE

(71) Applicant: Samsung Electronics Co., Ltd., Suwon-si, Gyeonggi-do (KR)

(72) Inventors: Soo-Yeon Jung, Seoul (KR); Hyuk-Choon Kwon, Seoul (KR); Ho-Dong Kim, Seoul (KR); Seung-Hoon Park, Seoul (KR); Hae-Young Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 750 days.

(21) Appl. No.: 14/354,766

(22) PCT Filed: Dec. 17, 2012

(86) PCT No.: PCT/KR2012/010997
§ 371 (c)(1),
(2) Date: Apr. 28, 2014

(87) PCT Pub. No.: WO2013/089527
PCT Pub. Date: Jun. 20, 2013

(65) Prior Publication Data
US 2014/0316923 A1    Oct. 23, 2014

(30) Foreign Application Priority Data
Dec. 16, 2011    (KR) ........................ 10-2011-0136263

(51) Int. Cl.
*G06Q 30/00* (2012.01)
*G06F 17/30* (2006.01)
(Continued)

(52) U.S. Cl.
CPC .............. *H04W 4/70* (2018.02); *G06Q 30/08* (2013.01); *H04W 4/001* (2013.01); *H04W 4/005* (2013.01);
(Continued)

(58) Field of Classification Search
CPC ............................... G06Q 30/08; H04W 4/70
(Continued)

(56) References Cited

U.S. PATENT DOCUMENTS

2003/0115098 A1    6/2003  Kang
2003/0225613 A1    12/2003 Shahoumian et al.
(Continued)

FOREIGN PATENT DOCUMENTS

JP    2002-149686 A    5/2002
JP    2007-164675 A    6/2007
(Continued)

OTHER PUBLICATIONS

General motors accelerates delivery of emergency backordered parts with OEConnection's D2D express(R). (Aug. 8, 2005). PR Newswire Retrieved from https://search.proquest.com/docview/451396238?accountid=14753.*
(Continued)

*Primary Examiner* — Kathleen Palavecino
(74) *Attorney, Agent, or Firm* — Jefferson IP Law, LLP (57) ABSTRACT

The present invention provides a method for providing a service to a device having an interest in a specific service in a device-to-device (D2D) condition. The method includes: searching for a device which enters into an area managed by a device which provides the specific service; and identifying an interest of the searched device in the specific service and inviting the searched device to participate in the specific service. In the method, by selectively connecting a session based on a service interest, an efficient management in view
(Continued)

of an entire network capacity is possible and an advantage of reducing a time for session connection is achieved.

10 Claims, 5 Drawing Sheets

(51) Int. Cl.
*H04W 4/70* (2018.01)
*H04W 4/50* (2018.01)
*H04W 4/80* (2018.01)
*H04W 4/00* (2018.01)
*H04W 4/06* (2009.01)
*G06Q 30/08* (2012.01)
*H04W 8/00* (2009.01)

(52) U.S. Cl.
CPC ............ *H04W 4/008* (2013.01); *H04W 4/06* (2013.01); *H04W 4/50* (2018.02); *H04W 4/80* (2018.02); *H04W 8/005* (2013.01)

(58) Field of Classification Search
USPC ....................................................... 705/26.3
See application file for complete search history.

(56) References Cited

U.S. PATENT DOCUMENTS

| | | | |
|---|---|---|---|
| 2006/0092895 | A1 | 5/2006 | Kim et al. |
| 2007/0112664 | A1* | 5/2007 | Zhang ................... G06Q 30/08 705/37 |
| 2011/0246567 | A1 | 10/2011 | Cedervall et al. |
| 2012/0303477 | A1* | 11/2012 | Ben-Itzhak ............ G06Q 30/02 705/26.7 |

FOREIGN PATENT DOCUMENTS

| | | |
|---|---|---|
| JP | 2008-515270 A | 5/2008 |
| JP | 2009-134524 A | 6/2009 |
| KR | 10-2011-0089882 A | 8/2011 |

OTHER PUBLICATIONS

The Korean Intellectual Property Office Notification of the Reasons for Rejection dated Nov. 1, 2017, issued in the Korea Application No. 10-2011-0136263.
The Korean Intellectual Property Office Notification of the Reasons for Rejection dated May 29, 2018, issued in the Korea Application No. 10-2011-0136263.

\* cited by examiner

APPARATUS AND METHOD FOR
PROVIDING A SPECIFIC SERVICE

TECHNICAL FIELD

The present invention relates to an apparatus and a method for providing a service using a device to device (D2D) communication and, more particularly, to an apparatus and a method for providing a service corresponding to a service interest.

BACKGROUND ART

When devices within a short range communication network perform a specific service, a short-range communication method such as WiFi or Bluetooth may be used. In order to perform a service according to a protocol of the WiFi or Bluetooth, two or more devices first need to be connected to each other to form a network. For example, a smart phone and a smart phone, a laptop and a mouse, or a tablet personal computer (PC) and a printer may be directly connected to each other to form the network, and additionally, a device may form the network with one or more devices such as a digital camera, an MP3 player, a game player, or a TV which is adjacent to the device.

Particularly, when considering a case of a basic service set (BSS) of WiFi, it is necessary for a user device to participate in the network through a connection with an access point (AP). Therefore, in a case of a legacy basic service set (Legacy BSS), if there exists no device that can serve as the access point, a communication and the service is not available. As an alternative solution, a WiFi Direct technology has been introduced. The WiFi Direct is a technology to permit a group owner authority to a general device so as to serve as a virtual access point even if there exists no access point, thereby generating the network to perform the service. Another example is an independent basic service set (IBSS). In this case, a process of participating into a preformed IBSS network or forming a new network is also required prior to performing the service.

DISCLOSURE OF INVENTION

Technical Problem

As described above, a device can perform a specific service only after a new network is formed or the device participates in a network that is already formed. Thus, a mechanism in which all devices are peer to peer connected in a PHY/MAC layer is very inefficient. Particularly, when more than several hundreds of devices are on the network, an enormous overhead may be caused. On the other hand, in case of a device-to-device communication, information about a device may be obtained without forming such a network, thereby enabling to provide a service. To this end, an organization which suggests technical specifications of the device-to-device communication provides standardization; however, a specific product and a service do not exist yet, and a procedure thereof is not defined either.

Solution to Problem

Therefore, there exists a need for a method of selectively providing a service to only a device which is interested in a specific service in order to increase network efficiency and improve user experience in the device.

Therefore, the present invention provides a device and a method for selectively providing a service only to a device which is interested in a specific service.

Also, the present invention provides a device and a method for providing an auction service based on a device-to-device communication.

In accordance with an aspect of the present invention, a method of providing a specific service in a device based on a device-to-device communication is provided. The method includes determining an interest in the specific service of at least one counterpart device which enters into a specific service area managed by the device; performing a session connection with a counterpart device having the interest in the specific service according to a determination result; and inviting the counterpart device to participate in the specific service.

In accordance with another aspect of the present invention, a device for providing a specific service based on a device-to-device communication is provided. The device includes a service interest management unit for determining an interest in the specific service of at least one counterpart device which enters into a specific service area managed by the device; a connection unit for performing a session connection with a counterpart device having the interest in the specific service according to a determination result; and a service connection/management unit for inviting the counterpart device to participate in the specific service.

BRIEF DESCRIPTION OF DRAWINGS

The above and other aspects, features, and advantages of the present invention will be more apparent from the following detailed description taken in conjunction with the accompanying drawings, in which.

BEST MODE FOR CARRYING OUT THE INVENTION

Hereinafter, preferable embodiments of the present invention will be described with reference to the accompanying drawings. It should be noted that the same elements will be designated by the same reference numerals whenever possible throughout the drawings. Also, a detailed description of known functions and configurations incorporated herein will be omitted when it may make the subject matter of the present invention rather unclear.

In the following description, a representative exemplary embodiment of the present invention to solve a technical problem described above will be described. Also, for illustrative purposes of the present invention, names of objectives defined in a device-to-device (hereinafter, D2D) service will be used; however, such standardization and names are not intended to limit the scope of the present invention, and it should be noted that the present invention may apply to a system which has a similar technical background.

The present invention provides a method of providing a service to a device which is interested in a specific service in a D2D circumstance. To this end, the present invention comprises a process of searching for a device which enters into an area managed by a device which provides the specific service and a process of identifying an interest of the searched device in the specific service and inviting the searched device to participate in the specific service. In this manner, by selectively connecting a session based on a service interest, an efficient management in view of an entire network capacity is possible and an advantage of reducing a time for session connection is achieved.

An operation of a device in which the above described function is implemented is described with reference to FIG. 1.

Figure 1:
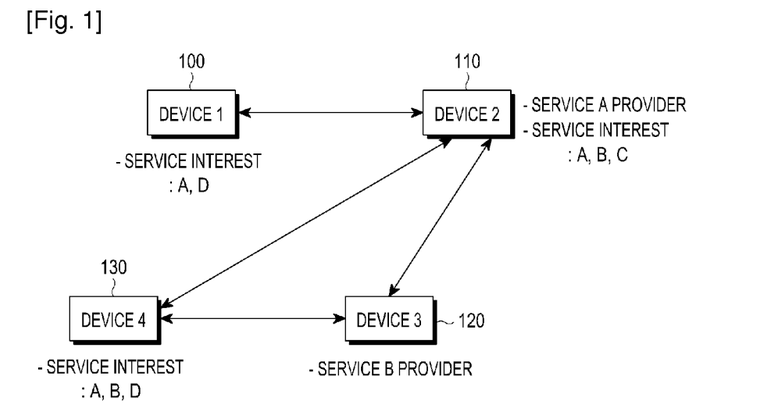
FIG. 1 is an example configuration view of a device-to-device (D2D) network according to an exemplary embodiment of the present invention.

FIG. 1 is an example configuration view of a device-to-device (D2D) network according to an exemplary embodiment of the present invention.

FIG. 1 illustrates a network configuration view for explaining a D2D network topology according to an exemplary embodiment of the present invention. Referring to FIG. 1, each of a device 1 through a device 4 100, 110, 120, 130 has a different interest in a service A, a service B, a service C, and a service D. Accordingly, each of the device 1 through device 4 100, 110, 120, 130 individually provide and use the service A, the service B, the service C, and the service D. Here, the device 1 through the device 4 100, 110, 120, 130 correspond to apparatuses which support a D2D service such as a smart phone, a mobile phone, a digital camera, an MP3 player, a game player, a TV, a display apparatus, and a vehicle head unit.

For example, the device 1 100 has an interest in and an intent of using the service A and the service D but does not have an interest in and an intent of using the service B or the service C. In this case, even if the device 3 120 which provides the service B provides the service B to the device 2 110 and the device 4 130, the device 3 120 does not need to provide the service B to the device 1 100. Accordingly, the device 3 120 may form a network by being session connected with the device 2 110 and the device 4 130, thereby providing the service B.

Similarly, the device 2 110 which provides the service A forms the network with the device 1 100 and the device 4 130 to provide the service A. In FIG. 1, it is shown that only the device 2 110 and the device 3 120 are service providers that are subjects of providing a service; however, the device may be the service provider while being a user device which uses the service.

Therefore, in a case where the device 1 100 wants to use the service A, a connection to the device 2 110 is required, and only a connection between the device 2 110 and the device 3 120 is required for the service B. Therefore, when a device which supports a specific service searches for a device which is interested in the service, a session connection to the searched device is only required. Accordingly, when a service in which the device 1 100 is interested and a service supported by the device 3 120 are different, a network does not need to be formed. Thus, in the present invention, in providing a service from a specific device, a session is not connected to all devices on the D2D network but a session is only selectively connected only to a device which is interested in the service provided by the specific device, thereby providing the service. Accordingly, since a service connection process based on the D2D is not to form a network by connecting to all devices on the network, the service connection process based on the D2D is performed very quickly compared to other short-range communication methods.

Figure 2:
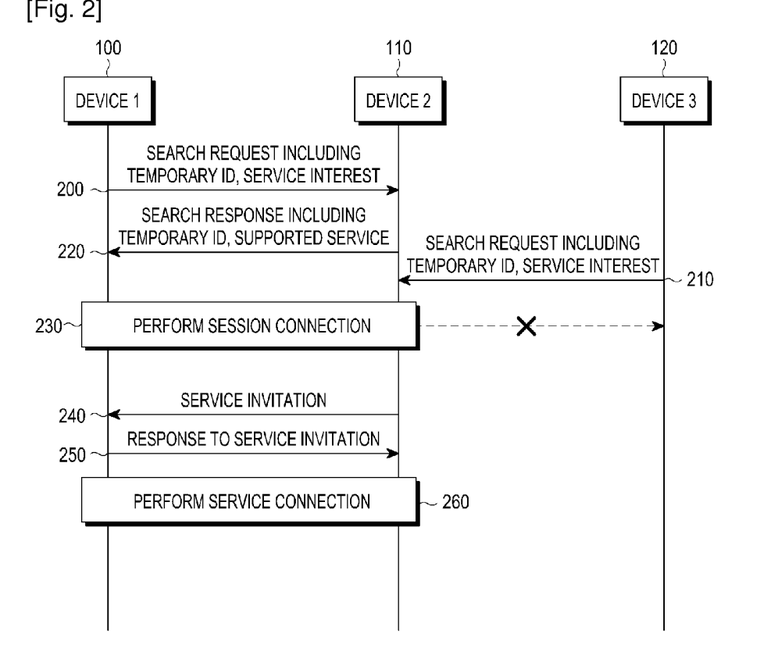
FIG. 2 is a flow diagram of an operation between devices for participating in a specific service according to an exemplary embodiment of the present invention.

First, a process of participating in a specific service according to an exemplary embodiment of the present invention is described with reference to FIG. 2. In FIG. 2, it is assumed that, similar to FIG. 1, the device 1 100 is interested in the services A and D, and it is assumed that the device 2 110 is a service provider which provides the service A. Here, if it is assumed that the service A is an auction service, the service provider may correspond to a device positioned in an auction service space, e.g., a shopping mall side.

Referring to FIG. 2, the device 1 100 sends a search request including a temporary identification (ID) and a service interest in step 200, which is an initial step of searching for a neighboring device and a service. Here, the temporary ID is a temporary ID of the device 1 100 which is used in a local area (e.g., a shopping mall) where the D2D service is available, and the service interest will be described in detail later. The search request may be transmitted when, after a user of the device 1 100 enters into the shopping mall, the user enters a service search request through a user interface of the device 1 100. Such a search request may be carried on, for example, a beacon signal to be transmitted to neighboring devices in a broadcast method.

Such a search request is transmitted to the neighboring devices, and in a case where the device 2 110 can provide the service A corresponding to a service interest included in the search request, a temporary ID of the device 2 110 and a search response including supported service information are transmitted to the device 1 100 in step 220. Here, the supported service information includes a service list currently used by the device 2 110.

Similarly, in step 210, the device 3 120 may transmit a temporary ID of the device 3 120 and a search request including the service interest to neighboring devices. However, if the device 3 120 is set to have an interest in the service B, the service B does not correspond to the service A supported by the device 2 110, and thus, the device 2 110 does not response to the search request from the device 3 120. As a result, the session connection between the device 2 110 and the device 3 120 is not performed. On the other hand, the session connection between the device 1 100 and the device 2 110 is performed in step 230.

As described above, when the session is connected between device 1 100 and the device 2 110, an environment for communication is created. Thus, when the network is formed, the device 2 110 transmits a service invitation message asking whether to use the service to the device 1 100 in step 240. Such a service invitation message includes at least one of a service ID, service description, and a service name. The service ID is used to distinguish a plurality of services provided by the service providers from one another.

The service description is brief information about the service having a corresponding service ID. The brief information about the service having such a service ID may have a predefined metadata or a form of a description, etc. The service name indicates a name of a program or a service application required to perform the service.

Here, the service provider may operate the same kind of a service yet different events. In such a case, the service invitation message further includes an event ID in order to identify each event, i.e., an event having the same service category but a different detailed content is identified. Accordingly, the service provider may manage by mapping an event ID used for each device to each temporary ID so that it may be possible to provide two or more events to the same device.

When the service invitation message is received, the device 1, 110 sends a response to the service invitation in step 250. Accordingly, a service connection between the device 1 100 and the device 2 110 is performed in step 260. Thus, only a device which receives the service invitation from the service provider, i.e., the device 2 110, may participate in the service.

Meanwhile, in the above, it is described that the device 1 100 which intends to use the service directly requests the service invitation while being located in a service area managed by the service provider, however, the device 1 100 may receive the service invitation message which is broadcasted upon entering into the service area managed by the service provider without a request from the device 1 100. In this case, by sending a response including the service interest thereof to a service provider side in response to the service invitation message, the service provider may be enabled to determine whether the device 1 100 participates in the service. Alternatively, when the service provider advertises a service provided by the service provider in a shopping mall space, a device that enters into the shopping mall space may search for the advertised service according to an input from a device user thereof to send an intent to participate in the searched service to the service provider, and thus, the device 1 100 may receive the service invitation message according to the participation intent.

Hereinafter, respective operations and elements thereof of the device 1 100 which is provided with the service and the device 2 110 which provides the service are described with reference to FIGS. 3 and 4.

Figure 3:
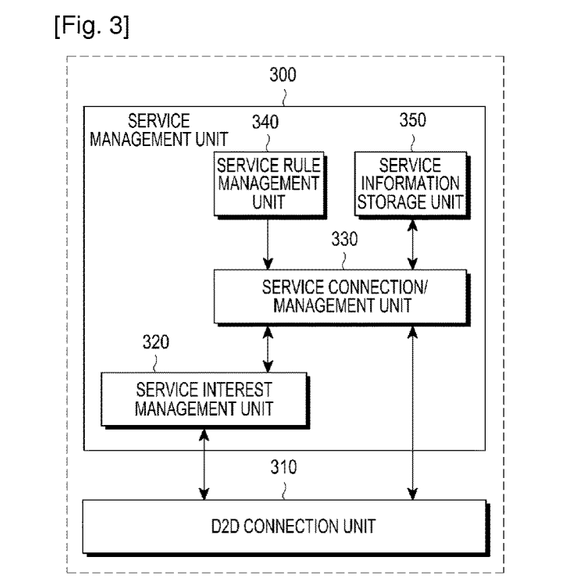
FIG. 3 is an internal block diagram of a device for providing a service according to an exemplary embodiment of the present invention.

First, referring to FIG. 3 which is an internal block configuration view of the device 2 110 that provides the service, the device 2 110 largely comprises a service management unit 300 which manages services and a D2D connection unit 310 for D2D connection.

The service management unit 300 may manage only one specific service or manage a plurality of services at the same time. The service management unit 300 includes a service interest management unit 320, a service connection/management unit 330, a service rule management unit 340, and a service information storage unit 350.

The D2D connection unit 310 serves to perform the session connection to counterpart device having an interest in a specific service.

The service interest management unit 320 determines an interest in the specific service of at least one counterpart device which enters into a specific service area managed thereby and then determines whether to provide the service managed thereby. If the service interest of the counterpart device indicates an intent to use the service provided thereby, the service interest management unit 320 may transmit information about the counterpart device to the service connection/management unit 330 to provide the service.

The service connection/management unit 330 serves to invite the counterpart device to participate in the specific service. Specifically, the service connection/management unit 330 identifies whether an environment in which the counterpart device can receive the service is created. If providing the service is not possible due to, for example, an absence of an execution program, the service connection/management unit 330 transmits a related announcement message or transmits the execution program, thereby serving to prepare a service providing environment. Also, the service connection/management unit 330 manages a mechanism for an advertisement of a corresponding service and a service invitation, and when a response to the advertisement and the service invitation from the counterpart device is received, the counterpart device is mapped with a service to be provided thereto and stored in the service information storage unit 350. If a plurality of services is to be provided, a service is mapped with each device to which the service is provided and stored in a database form.

If it is assumed that a service subject provides the auction service, the service connection/management unit 330 may transmit an advertisement of the auction service or an auction service invitation message to neighboring devices. Accordingly, when a response to the advertisement is received, the service connection/management unit 330 transmits the service invitation message, and when a response to the service invitation message is received, the service connection/management unit 330 performs to, for example, form a database with the service ID and connection information of the counterpart device to be stored in the service information storage unit 350.

Also, the service connection/management unit 330 performs to operate the service. For example, in a case of the auction service, the service connection/management unit 330 performs to receive bidding information of the counterpart device and transmit most recent bidding information to other devices within the D2D network. Also, the service connection/management unit 330 receives and identifies a service operation rule from the service rule management unit 340.

Thus, the service connection/management unit 330 determines a service termination time according to the service operation rule and, upon termination, transmits related information to the other devices within the D2D network. If a final successful bid is made in the auction service, the auction service is terminated and information about a final successful bidder and a bidding price is transmitted to devices which participate in the auction service. The service operation rule has a basic rule and a regulation needed to operate a corresponding service and is set by the service provider. According to the service operation rule, the service connection/management unit 330 may operate, in parallel, a plurality of services and each service may be divided by the service ID, etc.

Figure 4:
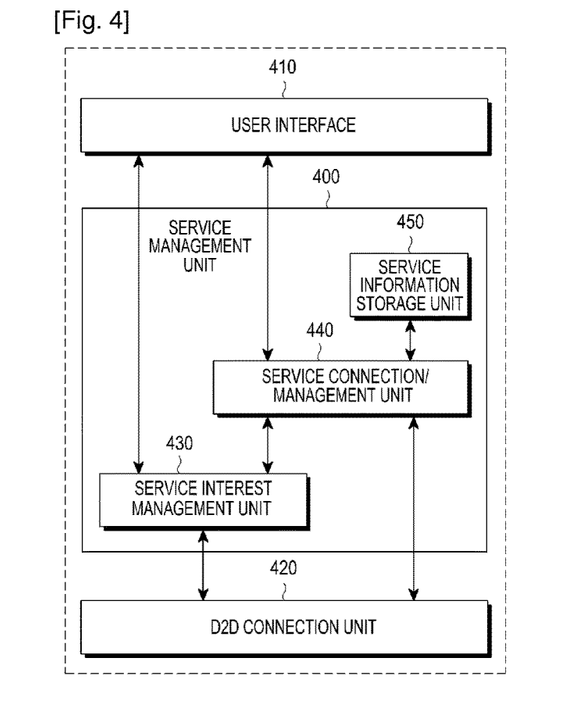
FIG. 4 is an internal block diagram of a device which is provided with a service according to an exemplary embodiment of the present invention.

On the other hand, an internal block configuration view of the device 1 100 which is provided with the service according to an exemplary embodiment of the present invention is illustrated in FIG. 4.

Referring to FIG. 4, the device 1 100 further includes a user interface 410 in addition to a service management unit 400 and a D2D connection unit 420.

First, the service management unit 400 (300→400 으로 국문수정) includes a service interest management unit 430, a service connection/management unit 440, and a service information storage unit 450. The service interest management unit 430 manages information about services in which the user is interested, i.e., service interest. The service interest includes information about various service fields, and a configuration thereof is as shown in below Table 1.

TABLE 1

| Service Interest | |
| --- | --- |
| Travel | Discount |
| Dining | Coupon |
| Cultured Life | Event |
| Books | Send information |
| News | ... |
| Electronic/Electric appliance | ... |
| Shopping | ... |
| ... | ... |
| ... | ... |

The services may be classified and managed according to categories shown in table 1. The management of a service interest item may be continually managed or upgraded by a specific administrator. An example of the specific administrator corresponds to a mobile communication operator, a terminal operator, a government or D2D network operator. Alternatively, the service interest item may be used to determine a value determined in advance according to a communication protocol, without requiring the specific administrator.

Figure 5:
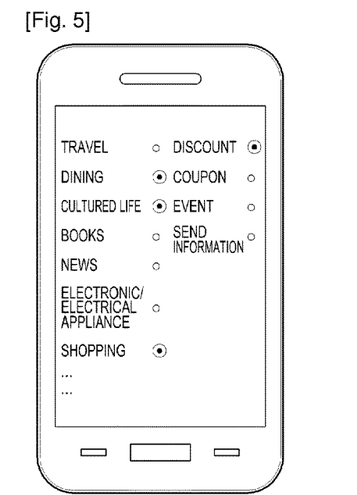
FIG. 5 is an example screen view of selecting a service interest item according to an exemplary embodiment of the present invention.

The user interface 410 is an input means of the user and outputs a screen for selecting a desired service interest item. The screen for selecting the service of interest is as shown in FIG. 5. The user may set the service of interest in advance through the screen shown in FIG. 5. For example, if the user has set an item for an electronic/electrical appliance in the present invention, when an auction service of the electronic/electrical appliance is in progress in the shopping mall, the service invitation may occur.

While the service interest may be directly set through the user interface 41, alternatively, the service interest may be automatically set through an application, etc.

When the service interest management unit 430 communicates with other devices through the D2D network, the service interest management unit 430 may send the service interest to other devices, when needed, through the D2D connection unit. If a connection request for a service in which the user is interested or related information is sent, the service interest management unit 430 provides information thereof to the user through the user interface 410.

When using the service, the service connection/management unit 440 receives information, a message, etc. about the service from the service provider, outputs information sent on the user interface 410 based thereon, and stores information which is needed to be stored such as the service ID or a coupon in the service information storage unit 450.

In case of the auction service, the bidding information, etc. of the user is received through the user interface 410 to be sent to a device which is a subject of providing the service through the D2D connection unit 420. Also, when bidding, successful bidding information, etc. is received from the device which is the subject of providing the service, the service information storage unit 450 is updated based thereon and notifies the user through the user interface 410. The service information storage unit 450 performs to store various information such as the service ID, a connection ID, the temporary ID, and the coupon.

Meanwhile, FIG. 2 shows an example case of sending the service interest prior to the session connection; however, the service interest may be requested and received from the device which provides the service after the session connection.

Figure 6:
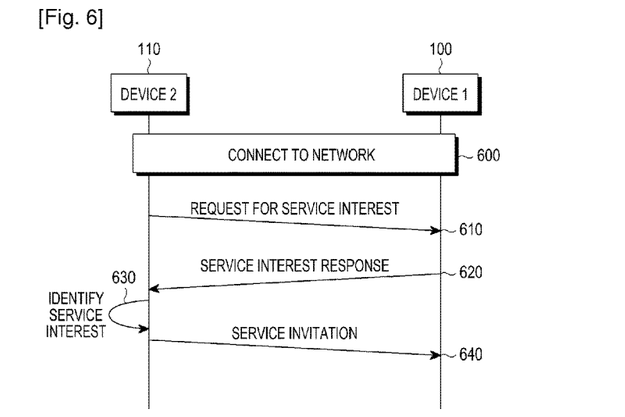
FIG. 6 is a flow chart illustrating a process of transmitting a service interest according to an exemplary embodiment of the present invention.

Referring to FIG. 6, in step 600, a network connection process between the device 1 100 and the device 2 110 represents a process in which the device 1 100 enters into the service area in which the auction service is provided and then is session connected with the device 2 110 which provides the auction service. After the session is connected, in order for the device 2 110 to determine whether there exists an interest in the auction service provided thereby, the service interest of the device 1 100 is requested in step 610 and receives a service interest response in step 620. The service interest response includes the service interest set in the device 1 100, and accordingly, the device 2 110 identifies the service interest in step 630. If a service corresponding to the identified service interest can be provided, i.e., a service category provided by the device 2 110 is included, the device 2 110 transmits the service invitation message to the device 1 100 in step 640.

Figure 7:
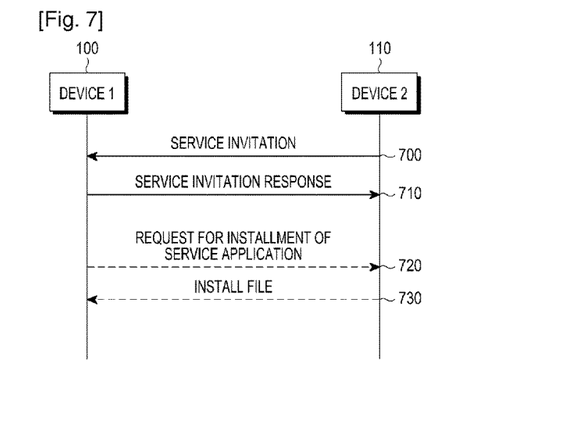
FIGS. 7 and 8 are flow charts illustrating a process of installing a service application according to an exemplary embodiment of the present invention.

Thus, when the device 1 100 is interested in the service provided by the device 2 110, there may occur a case where a program or an application for using the service may not exist. In such a case, as shown in FIG. 7, in response to the service invitation message sent to the device 1 100 in step 700, a service invitation response indicating an intent to participate in the service provided by the device 2 110 is sent in step 710, and then a service application install request is sent in step 720 in order to install the program or the application required for using the service. Then the device 2 110 transmits an install file in step 730. Although such an install request may be transmitted separately from the service invitation response, the install request may be transmitted as in FIG. 8 alternatively.

Figure 8:
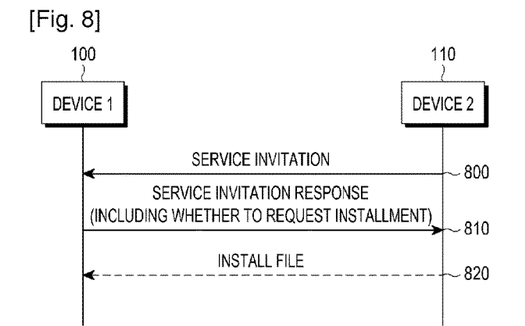

Step 800 and step 820 of FIG. 8 are the same as step 700 and step 730 of FIG. 7 except that whether to send the install request may be included in the service invitation response to be transmitted, similar to step 810.

Hereinafter, exemplary embodiments of the present invention described herein are separately described as follows. A first exemplary embodiment of the present invention relates to a case in which the device enters into the service area managed by the auction service provider and is provided with the auction service from the auction service provider. A second exemplary embodiment of the present invention relates to an auction service between individuals.

First, a first exemplary embodiment of the present invention is described with reference to FIG. 9. A radius of a current D2D service is about 1 Km, and thus, it is possible to provide the auction service to the device which enters into the shopping mall according to an exemplary embodiment of the present invention.

Figure 9:
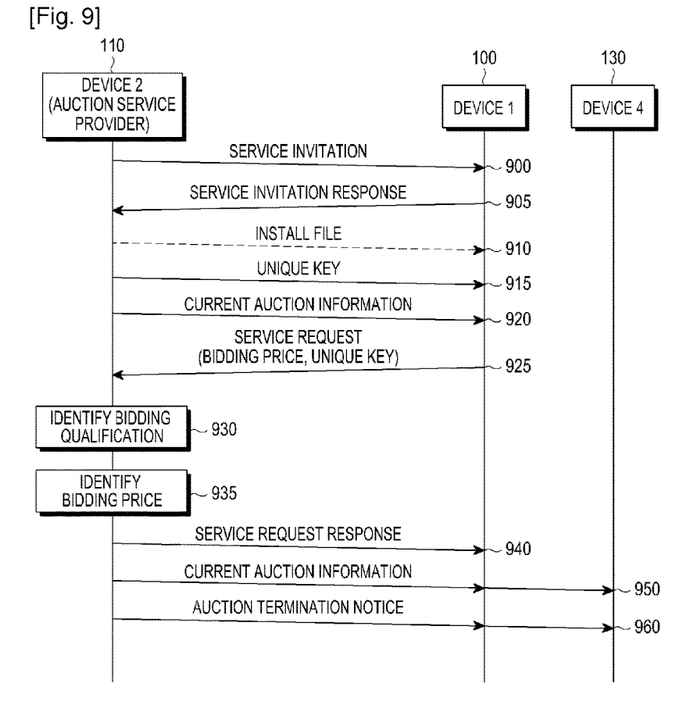
FIG. 9 is a flow chart illustrating an auction service process according to a first exemplary embodiment of the present invention.

Referring to FIG. 9, the device 2 110 transmits the auction service invitation message when the device 1 100 enters into the auction service space managed thereby in step 900. Here, the auction service invitation message may be broadcasted to a customer device which visits the auction service space for a real time auction service. Alternatively, as in FIG. 2, the device 1 100 which is located in the auction service space may directly transmit a search request for the device which provides the auction service such that the device 2 1100 may transmit the auction service invitation message after the session is connected thereto.

A process of transmitting the auction service invitation response message which is an intent to participate in the auction service from the device 1 100 (110→100 수정 to the device 2 110 in step 905 has already been described above, and when the program or the application for using the auction service does not exist in the device 1 100, the install file is received in step 910 to create the environment for the auction service.

The device 2 transmits a unique key to the device 1 100 in step 915, wherein the unique key is issued to a device that qualifies to use the auction service. Such a unique key may be used to refer to the same meaning as the term "token" or "shared key." Next, the device 2 110 transmits current auction information to the device 1 100 in step 920. The current auction information may be a current price, a highest bidding person, a deadline, a countdown to the deadline, a number of bidding participants, and average information of bidding participants.

Next, in step 925, in a case where the device 1 100 wants to participate in the auction service, the service request including the shared key is transmitted to the device 2 110 to notify that the device 1 100 is a permitted participant. The service request may include, in addition to the shared key, information needed for bidding such as a bidding item and a bidding price. Such a unique key may be included in the service request or may be used in encoding the service request.

The device 2 110 identifies a bidding qualification to determine the permitted participants based on the information included in the service request in step 930 and identifies the bidding price in step 935. When the bidding qualification is identified, the service request response is transmitted to the device 1 100 in step 940. Next, auction information is updated according to the bidding price, the bidding item, etc. provided from the device 1 100, and thus, the device 2 110 transmits current updated auction information to all devices that participate in the auction, e.g., the device 1 100 and the device 4 130 in step 950. Next, the device 2 110 terminates the auction service according to an auction service termination condition in step 960 and transmits an auction termination notice including a final result to the device 1 and the device 4.

Figure 10:
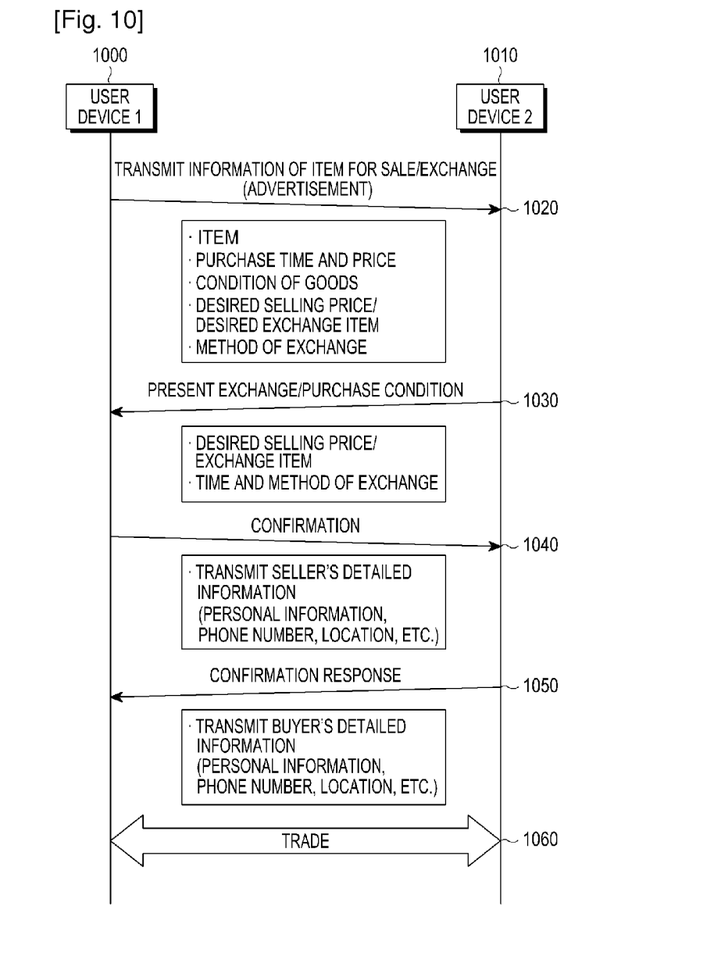
FIG. 10 is a flow chart illustrating an auction service process according to a second exemplary embodiment of the present invention.

As described above, according to the first exemplary embodiment of the present invention, since the service provider which manages the specific service area provides the auction service, restrictions by a limited space, number of people, time, etc. may be improved when compared with a live auction, and further, when compared with an online auction, a problem that the service cannot be provided to only users located in a specific space is solved and an advantage of restricting a user access from multiple and unspecified persons through a web site is achieved On the other hand, the first exemplary embodiment of the present invention may be applied to an item exchange service between individuals. FIG. 10 illustrates a process of an item exchange service between individuals according to the second exemplary embodiment of the present invention.

Referring to FIG. 10, after the D2D network is formed between a user device 1 1000 and a user device 2 1010, the user device 1 1000 transmits information about an item for sale/exchange to the user device 1010 in step 1020. An example of the information about the item for sale/exchange includes an item, a purchase time and price, a condition of goods, a desired selling price and a desired exchange item, a method of exchange, etc.

In response, the user device 2 1010 presents an exchange/purchase condition in step 1030. The exchange/purchase condition includes a purchase price and the exchange item, and a time and a method for exchange. Then, when the user device 1 1000 accepts the condition, a confirmation message is sent in step 1040. The confirmation message includes a seller's detailed information such as personal information, a phone number, a location, etc. Upon receiving a confirmation response by the user device 1000 in step 1050, a trade begins in step 1060. Here, the confirmation response message includes a buyer's detailed information such as personal information, a phone number, a location, etc. In this case, when the trade begins, the personal information of two users, the user device 1 1000 and the user device 2 1010, will be open to each other.

According to the present invention, the session is selectively connected based on the service interest in a system which supports for the D2D such that an efficient management in view of an entire network capacity is possible, and particularly, an advantage of reducing a time for session connection is achieved. In addition, the service is provided based on the service interest, and thus, a device in which a related application is not installed may also be provided with information about a service corresponding to a user interest.

In addition, by providing the auction service based on the device-to-device communication, when compared with a live auction, restrictions by a limited space, number of people, time, etc. may be improved, and further, when compared with an online auction, a problem that the service cannot be provided to only users located in a specific space is solved and an advantage of restricting a user access from multiple and unspecified persons through a web site is achieved.

The invention claimed is:

1. A method of providing a specific service in a device based on a device-to-device communication, the method comprising:
   prior to a session connection between the device and first and second counterpart devices:
      receiving, by a communication device of the device, first and second search requests including service interest from the first and second counterpart devices which enter into a specific service area that is managed by the device,
      determining, by a processor of the device, an interest in the specific service of each of the first and second counterpart device based on the service interest, and
      when determining that the first counterpart device is interested in the specific service and the second counterpart device is not interested in the specific service, transmitting, by the communication device, to the first counterpart device a response to the first search request without transmitting to the second counterpart device a response to the second search request;
   performing, by the communication device, the session connection with the first counterpart device; and
   directly transmitting, by the communication device, an invitation message to the first counterpart device, the invitation message for inviting the first counterpart device to participate in the specific service using the session connection.

2. The method of claim 1, wherein the service interest includes information about a service category in which the first or second counterpart device has an interest.

3. The method of claim 1, further comprising:
   receiving, by the communication device, an application install request for executing the specific service from the first counterpart device; and
   providing, by the communication device, an install file to the first counterpart device.

4. The method of claim 1, wherein the specific service is an auction service based on the device-to-device communication.

5. The method of claim 4, further comprising:
transmitting, by the communication device, current auction information to the first counterpart device;
receiving, by the communication device, bidding information from the first counterpart device based on the auction information;
determining, by the processor, a successful bidding price of the auction service based on the bidding information; and
notifying, by the communication device, a final successful bidding result to all devices which participate in the auction service.

6. A device for providing a specific service based on a device-to-device communication, the device comprising:
a communication device; and
a processor configured to:
prior to a session connection between the device and first and second counterpart devices:
control the communication device to receive first and second search requests including service interest from the first and second counterpart devices which enter into a specific service area that is managed by the device,
determine, based on the service interest, an interest in the specific service of each of the first and second counterpart devices, and
when determining that the first counterpart device is interested in the specific service and the second counterpart device is not interested in the specific service, control the communication device to perform a session connection with the first counterpart device without performing a session connection with the second counterpart device,
control the communication device to perform a session connection with the first counterpart device, and
control the communication device to directly transmit, to the first counterpart device, an invitation message for inviting the first counterpart device to participate in the specific service using the session connection.

7. The device of claim 6, wherein the service interest includes information about a service category in which the first or second counterpart device has an interest.

8. The device of claim 7, wherein, when an event having the same service category but different detailed contents is operated, the service interest further includes an event identification (ID) for identifying the event.

9. The device of claim 6, wherein the communication device is further configured to:
receive an application install request for executing the specific service from the first counterpart device which responds to the invitation message, and
provide an install file to the first counterpart device.

10. The device of claim 6, wherein the specific service is an auction service based on the device-to-device communication.

* * * * *